United States Patent [19]
Yano

[11] Patent Number: 6,104,543
[45] Date of Patent: Aug. 15, 2000

[54] EYEPIECE OPTICAL SYSTEM

[75] Inventor: Takaaki Yano, Hokkaido, Japan

[73] Assignee: Asahi Kogaku Kogyo Kabushiki Kaisha, Tokyo, Japan

[21] Appl. No.: 09/398,143

[22] Filed: Sep. 17, 1999

[30] Foreign Application Priority Data

Sep. 18, 1998 [JP] Japan .................................. 10-265304

[51] Int. Cl.⁷ ................................................... G02B 25/00
[52] U.S. Cl. ........................... 359/645; 359/643; 359/644
[58] Field of Search ...................... 359/643–647

[56] References Cited

U.S. PATENT DOCUMENTS

| 5,353,162 | 10/1994 | Ito et al. | 359/692 |
| 5,589,976 | 12/1996 | Kanai et al. | 359/362 |
| 5,619,379 | 4/1997 | Fukumoto | 359/644 |
| 5,959,782 | 9/1999 | Hankawa | 359/643 |

FOREIGN PATENT DOCUMENTS

| 8-5937 | 1/1996 | Japan . |
| 8-76033 | 3/1996 | Japan . |

*Primary Examiner*—Georgia Epps
*Assistant Examiner*—Michael A Lucas
*Attorney, Agent, or Firm*—Greenblum & Bernstein, P.L.C.

[57] ABSTRACT

An eyepiece optical system includes the first lens group constituted by a negative single meniscus lens element having a convex surface on the side of a user's eye, and the second lens group having positive power as a whole, in this order from the object, whereby an intermediate image formed by an objective optical system is positioned between the first lens group and the second lens group. The second lens group includes a positive single meniscus lens element having a convex surface on the side of a user's eye, and a cemented sub-lens group having positive power as a whole. The cemented sub-lens group includes a positive lens element and a negative lens element. Furthermore, the eyepiece optical system satisfies the following conditions:

$$-15 < f_1/f_e < -3.5 \qquad (1)$$

$$-10 < f_1/f_2 < -3.0 \qquad (2)$$

wherein
$f_1$ designates the focal length of the first lens group;
$f_2$ designates the focal length of the second lens group; and
$f_e$ designates the focal length of the entire lens system.

4 Claims, 7 Drawing Sheets

EYEPIECE OPTICAL SYSTEM

BACKGROUND OF THE INVENTION

1. Field of the Invention

The present invention relates to an eyepiece optical system which is used in combination with an objective optical system of a telescope or binoculars.

2. Description of the Related Art

In the prior art, various eyepiece optical systems which position an image formed by the objective optical system between predetermined lens groups constituting the eyepiece optical systems have been proposed. For example, Japanese Unexamined Patent Publication No. Hei-8-76033 proposes an eyepiece optical system in which the first lens group has negative power and the second lens group has positive power, and an intermediate image is formed between these two lens groups. However, since the power of the first lens group is strong, a large amount of aberrations occur, and it is difficult to correct the aberrations through the second lens group. Also, the diameter of the second lens group tends to be made larger in order to perform the correcting of aberrations.

Furthermore, Japanese Unexamined Patent Publication No. Hei-8-5937 proposes an eyepiece optical system which arranges the first lens group constituted by a meniscus lens element, an intermediate image, the positive second lens group, and the positive third lens group, in this order from the object. However, throughout the embodiments taught therein, since the first lens group has positive power, the Petzval sum of the entire lens system, including the second and third lens groups, is large. In other words, field curvature increases, and the eye relief becomes shorter.

SUMMARY OF THE INVENTION

It is an object of the present invention to provide a compact eyepiece optical system wherein various aberrations are adequately corrected while a sufficient eye relief (the distance from the final surface at the side of a user's eye to the eyepoint) is maintained.

In order to achieve the above-mentioned object, there is provided an eyepiece optical system including the first lens group constituted by a negative single meniscus lens element having a convex surface on the side of a user's eye, and the second lens group having positive power as a whole, in this order from the object, whereby an intermediate image formed by an objective optical system is positioned between the first lens group and the second lens group. The second lens group includes a positive single meniscus lens element having a convex surface on the side of a user's eye, and a cemented sub-lens group having positive power as a whole, in this order from the object. The sub-lens group includes a positive lens element and a negative lens element. Furthermore, the eyepiece optical system satisfies the following conditions:

$$-15 < f_1/f_e < -3.5 \quad (1)$$

$$-10 < f_1/f_2 < -3.0 \quad (2)$$

wherein $f_1$ designates the focal length of the first lens group;

$f_2$ designates the focal length of the second lens group; and $f_e$ designates the focal length of the entire lens system.

The eyepiece optical system of the present invention preferably satisfies the following condition:

$$1.5 < LD/f_e < 2.4 \quad (3)$$

wherein

LD designates the distance from the most object-side surface of the first lens group to the most user's eye-side surface of the second lens group.

In an aspect of the correcting of aberrations, the negative single meniscus lens element which constitutes the first lens group and/or the positive single meniscus lens element in the second lens group are preferably a plastic lens element, and further, at least one lens surface thereof is preferably an aspherical surface.

The present disclosure relates to subject matter contained in Japanese Patent Application No. Hei-10-265304 (filed on Sep. 18, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 7:
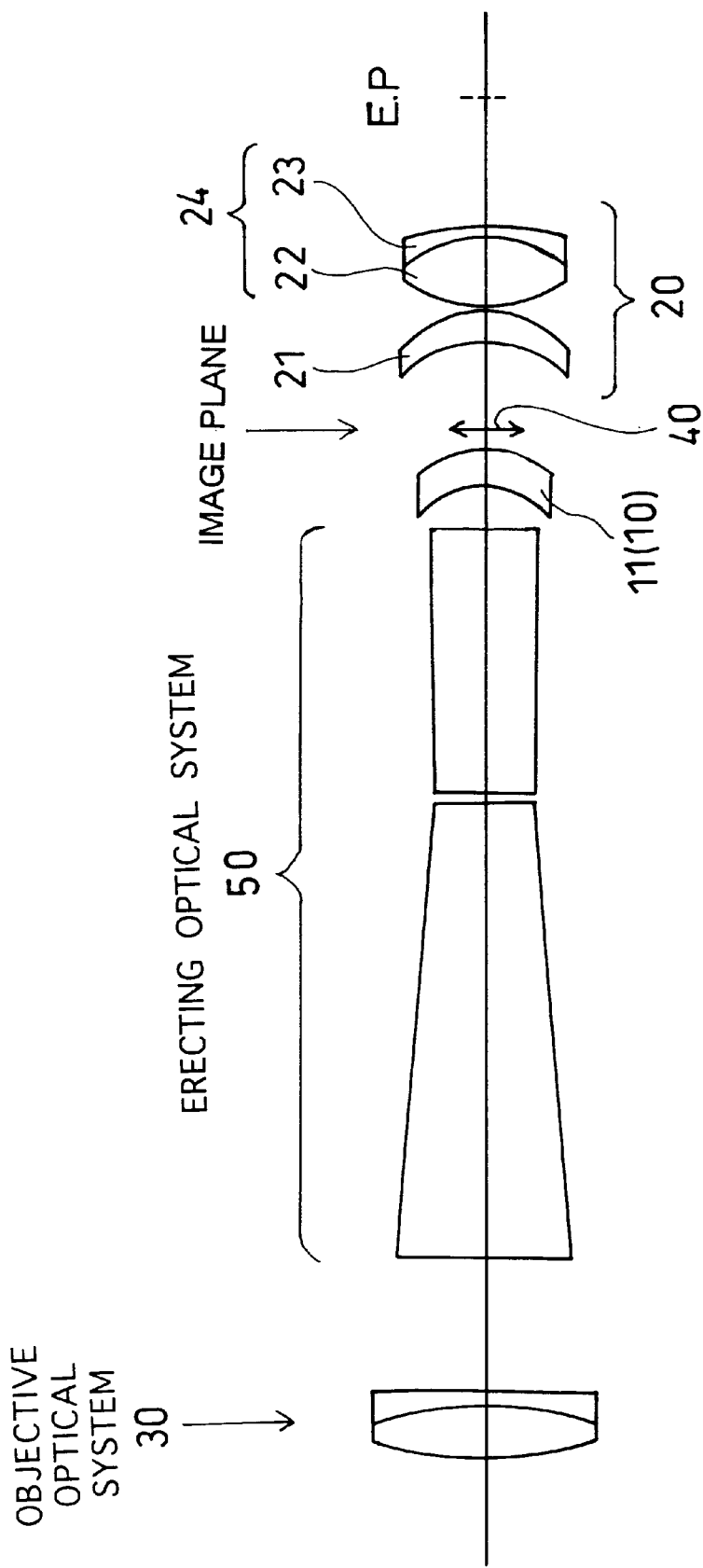
FIG. 7 is an overall view of a viewing optical system which includes an eyepiece optical system according to the present invention.

FIG. 7 is an overall view of a viewing optical system (a telescope or binoculars) which includes an eyepiece optical system according to the present invention. The eyepiece optical system includes the first lens group 10 constituted by a negative single meniscus lens element 11 having a convex surface on the side of a user's eye, and the second lens group 20 which as a whole has positive power, in this order from the object. An intermediate image 40 formed by an objective optical system 30 is positioned between the first lens group 10 and second lens group 20. A numeral 50 indicates an erecting optical system. A symbol E.P. designates the eyepoint.

As explained, when the intermediate image 40 is formed to be positioned between the first lens group 10 and the second lens group 20 (i.e., by providing the lens elements on both sides of the intermediate image 40), the correcting of aberrations becomes easy, since the upper and lower off-axis light rays with respect to the principal ray mutually change the positions thereof, whereby the tendency of aberrations is mutually reversed with respect to the first and second lens groups. Furthermore, since the first lens group 10 is constituted by the negative single meniscus lens element 11 which has a convex surface on the side of a user's eye and is formed as a divergent lens element, off-axis light rays which are incident on the first lens group 10 are bent outward whereby the height of off-axis light rays at the position of the intermediate image 40 can be increased. As a result, the eye relief can be made longer. Also, since the first lens group 10 has negative power, the Petzval sum of the entire lens system can be decreased. Accordingly, field curvature is suppressed, and the flatness of the image is improved. Moreover, by providing at least one aspherical surface on the negative single meniscus lens element 11 constituting the first lens group 10, the correcting of aberrations, in particular, of distortion and astigmatism, can be effectively performed.

The second lens group 20, in the embodiment, includes a positive single meniscus lens element 21 having a convex surface on the side of a user's eye, and a cemented sub-lens group 24 which as a whole has positive power, and is constituted by a positive lens element 22 and a negative lens element 23, in this order from the object. However, the order of the positive and negative lens elements in the cemented sub-lens group is not specifically required.

If the positive single meniscus lens element 21 which has converging power on the side of a user's eye is provided on the object-side within the second lens group 20, an increase of the diameter of the cemented sub-lens group 24 is prevented, and coma can suitably be corrected. Furthermore, by forming an aspherical surface on at least one surface of the positive single meniscus lens element 21, the correcting of aberrations, in particular, of distortion and field curvature, can be effectively performed. The cemented sub-lens group 24 is effective in correcting lateral chromatic aberration and axial chromatic aberration.

Conditions (1) through (3) will be described hereinafter.

Condition (1) specifies an appropriate range of the ratio of the focal length of the first lens group 10 to the focal length of the entire lens system, and at the same time, indirectly specifies the length of the eye relief and the flatness of the image plane.

If the negative power of the first lens group 10 is made weaker to the extent that $f_1/f_e$ exceeds the lower limit of condition (1), the diverging power of the first lens group 10 is reduced, so that the intermediate image 40 moves away from the second lens group 20, and the position of the entrance pupil with respect to the second lens group 20 also moves away. As a result, the eye relief becomes shorter, and the Petzval sum of the entire lens system increases, whereby the flatness of the image plane cannot be maintained. Conversely, if the negative power of the first lens group 10 is made too stronger to the extent that $f_1/f_e$ exceeds the upper limit of condition (1), aberrations in the first lens group 10 become larger, and it is difficult to correct the aberrations through the second lens group 20. Furthermore, due to an excessive diverging power of the first lens group 10, the diameter of the second lens group 20 has to be increased.

Condition (2) specifies the ratio of the focal length of the first lens group 10 to the focal length of the second lens group 20.

If $f_1/f_2$ exceeds the lower limit of condition (2), the Petzval sum is increased and the correcting of field curvature becomes difficult. Conversely, if $f_1/f_2$ exceeds the upper limit of condition (2), the negative power of the first lens group 10 becomes too strong, whereby aberrations in the first lens group 10 become larger, and it is difficult to correct the aberrations through the second lens group 20.

Condition (3) specifies the ratio of the length of the entire lens system to the focal length of the entire lens system, for achieving a compact and easy-to-use eyepiece optical system. Generally, the entire length of an eyepiece optical system tends to become longer when the focal length of the entire lens system becomes longer, and when the entire lens system is a wide-angle lens system because the number of lens elements increases.

If $LD/f_e$ exceeds the upper limit of condition (3), the compactness of the entire lens system is not attained. Conversely, if $LD/f_e$ exceeds the lower limit of condition (3), the lens system can be made compact; however, the eye relief becomes shorter, and foreign matter in the close vicinity of the intermediate image 40 becomes noticeable, which causes unpleasantness to a user.

Specific numerical data of the embodiments will be described hereinafter. In the tables and drawing of the following embodiments, $\emptyset$ designates the diameter of the exit pupil, f designates the focal length, m designates the transverse magnification, β designates the apparent visual angle (half visual angle), $f_b$ designates the back focal distance, ER designates the eye relief, R designates the radius of curvature of the lens surface, D designates the lens thickness or distance between lens elements, N designates the refractive index at the d-line, and ν designates the Abbe number. In the diagrams of chromatic aberration represented by spherical aberrations, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image.

In addition to the above, an aspherical surface which is symmetrical with respect to the optical axis is defined as follows:

$$x = Ch^2/\{1+[1-(1+K)C^2h^2]^{1/2}\} + A4h^4 + A6h^6 + A8h^8 + A10h^{10};$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient;

Embodiment 1

Figure 1:
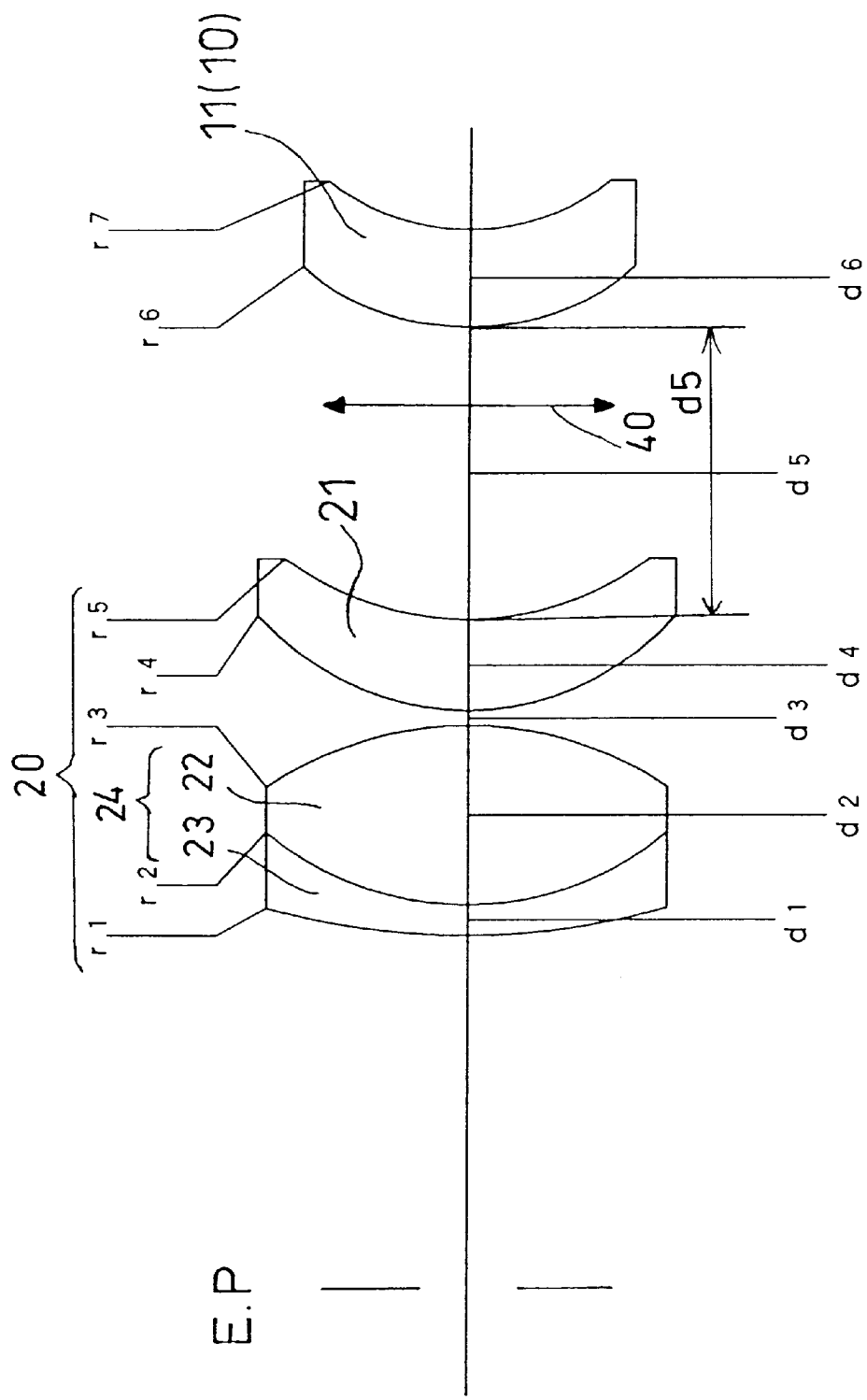
FIG. 1 is a lens arrangement of the first embodiment of an eyepiece optical system according to the present invention.
Figure 2:
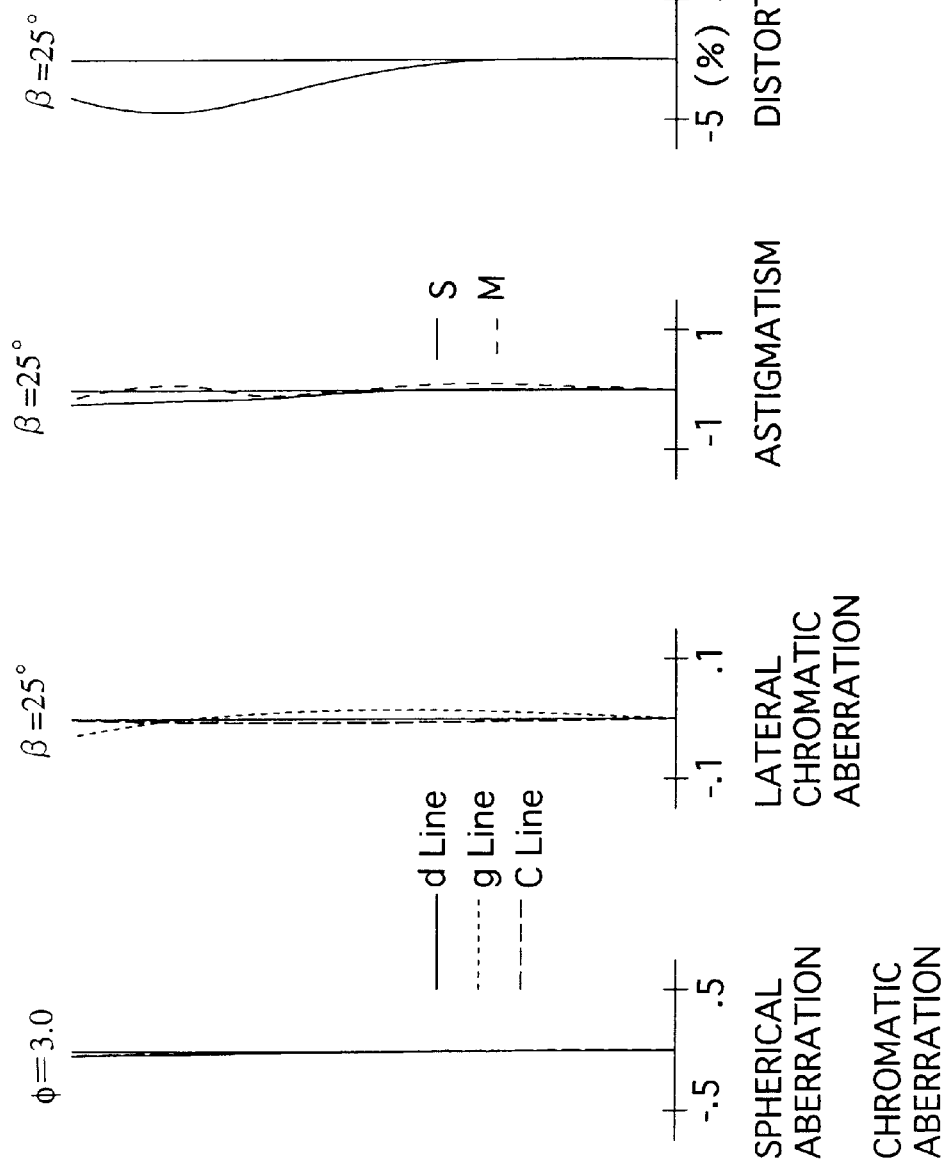
FIGS. 2A, 2B, 2C and 2D are aberration diagrams of the lens system of FIG. 1.

FIGS. 1 and 2A through 2D show the first embodiment of an eyepiece optical system according to the present invention. FIG. 1 is a lens arrangement of the eyepiece optical system, and Table 1 shows the lens data thereof. FIGS. 2A, 2B, 2C and 2D are aberration diagrams of the lens system of FIG. 1. Note that the lens surface numbers are counted from the side of a user's eye.

TABLE 1

$\phi = 3.0$
$f = 10.68$

TABLE 1-continued $\phi = 3.0$
$f = 10.60$
m = 0.011
$\beta = 25°$
$f_b = -3.01$
ER = 11.7

| Surface No. | R | D | N | ν |
|---|---|---|---|---|
| 1 | 23.552 | 1.000 | 1.78472 | 25.7 |
| 2 | 10.021 | 5.900 | 1.58913 | 61.2 |
| 3 | -11.576 | 0.500 | — | — |
| 4* | 8.291 | 3.000 | 1.49176 | 57.4 |
| 5 | 9.687 | 9.620 | — | — |
| 6* | 9.793 | 3.200 | 1.49176 | 57.4 |
| 7 | 7.272 | — | — | — |

*designates the aspherical surface which is rotationally symmetrical with respect to the optical axis.

Aspherical surface data (the aspherical surface coefficients not indicated are zero (0.00)):

No.4 K=0.0 A4=$-0.1701\times10^{-3}$ A6=$0.2509\times10^{-5}$ A8=$-0.6733\times10^{-7}$ No.6 K=0.0 A4=$0.8816\times10^{-3}$ A6=$-0.3555\times10^{-4}$ A8=$0.7165\times10^{-6}$ Embodiment 2

Figure 3:
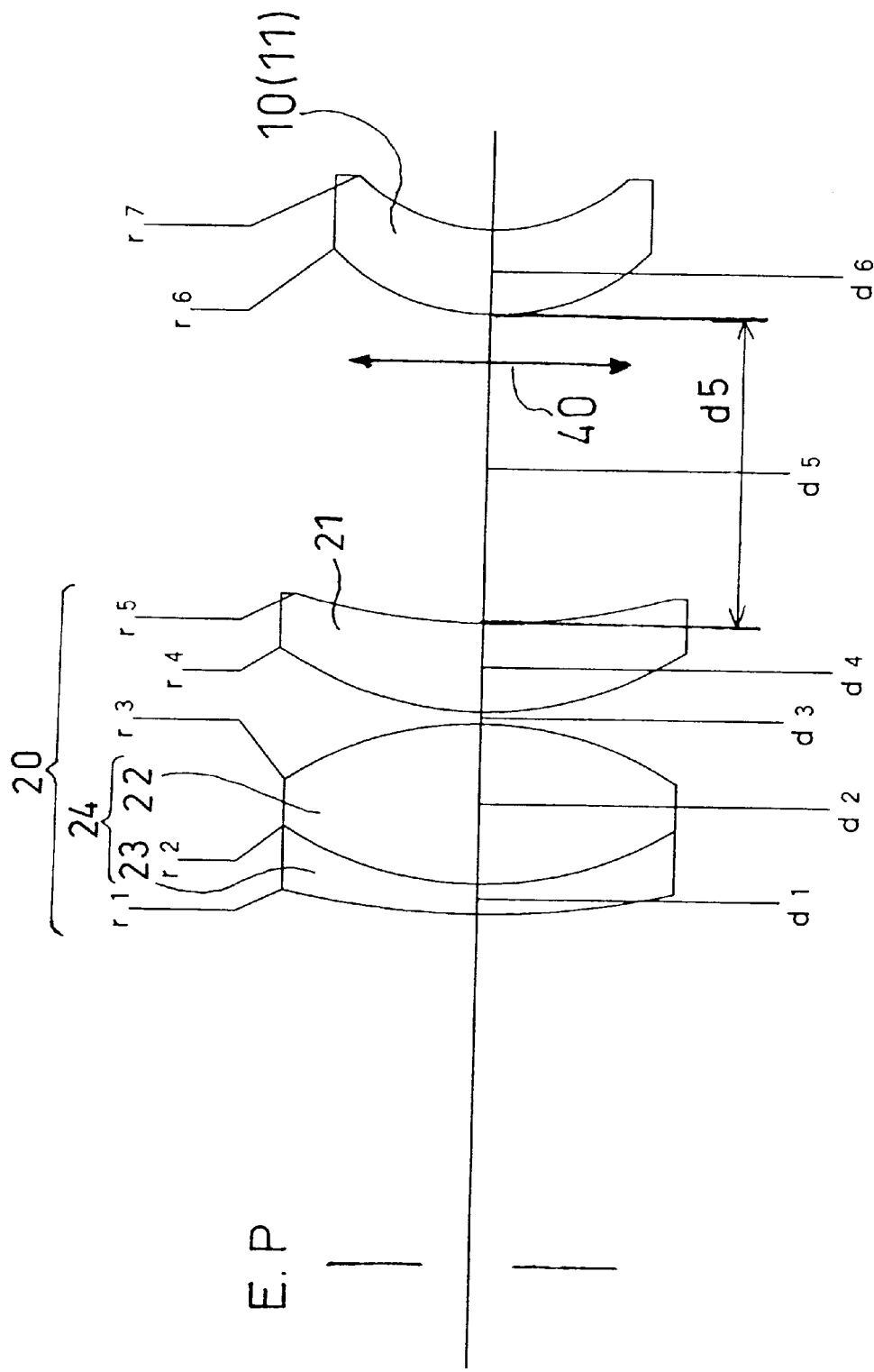
FIG. 3 is a lens arrangement of the second embodiment of an eyepiece optical system according to the present invention.
Figure 4:
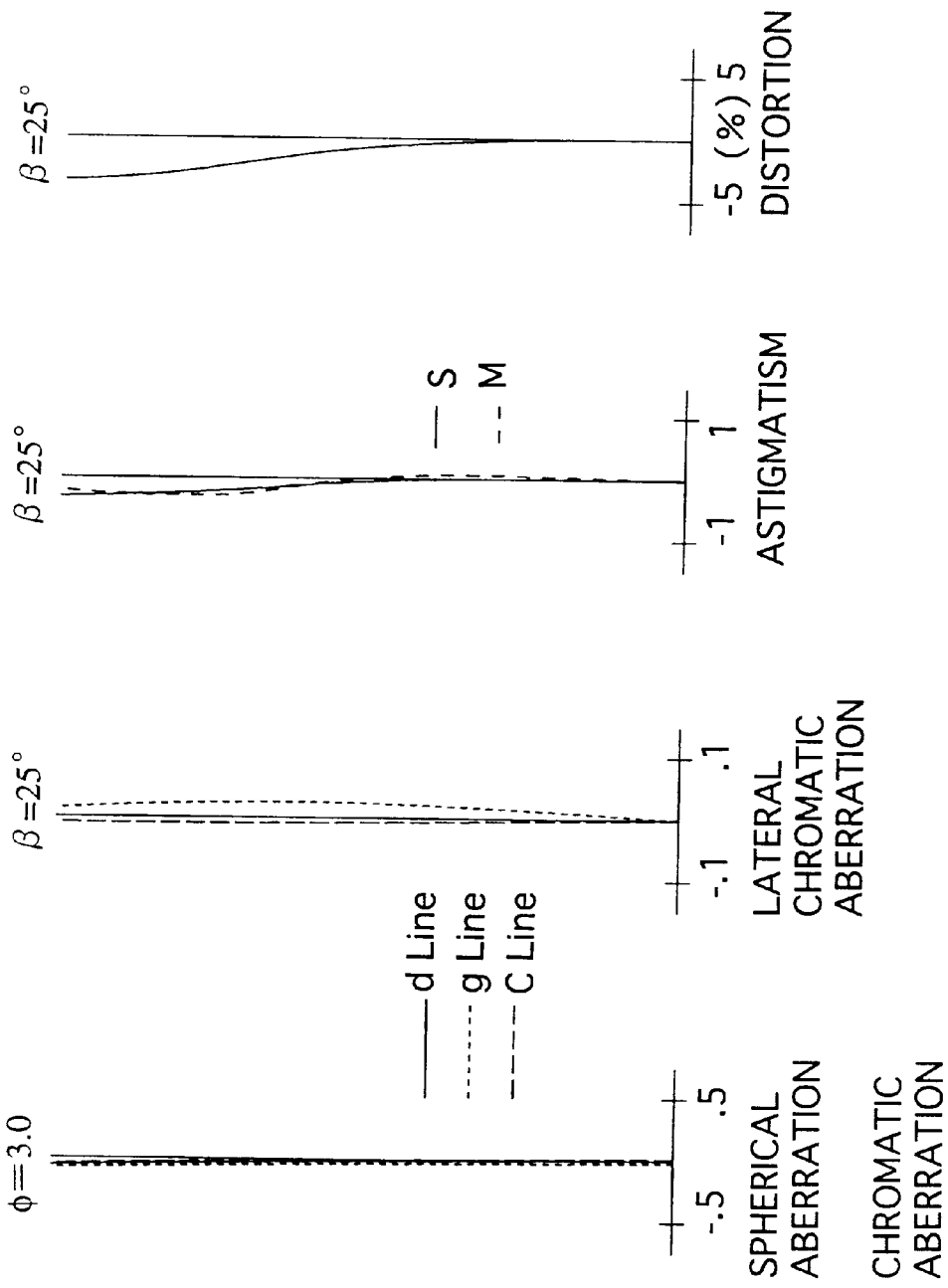
FIGS. 4A, 4B, 4C and 4D are aberration diagrams of the lens system of FIG. 3.

FIGS. 3 and 4A through 4D show the second embodiment of an eyepiece optical system according to the present invention. FIG. 3 is a lens arrangement of the eyepiece optical system, and Table 2 shows the lens data thereof. FIGS. 4A, 4B, 4C and 4D are aberration diagrams of the lens system of FIG. 3.

TABLE 2

$\phi = 3.0$
$f = 10.60$
m = 0.011
$\beta = 25°$
$f_b = -2.88$
ER = 11.88

| Surface No. | R | D | N | ν |
|---|---|---|---|---|
| 1 | 29.907 | 1.000 | 1.78472 | 25.7 |
| 2 | 12.345 | 5.400 | 1.58913 | 61.2 |
| 3 | -11.938 | 0.400 | — | — |
| 4* | 11.403 | 3.000 | 1.49176 | 57.4 |
| 5 | 21.777 | 10.480 | — | — |
| 6* | 9.332 | 2.870 | 1.49176 | 57.4 |
| 7 | 6.542 | — | — | — |

*designates the aspherical surface which is rotationally symmetrical with respect to the optical axis.

Aspherical surface data (the aspherical surface coefficients not indicated are zero (0.00)):

No.4 K=0.0 A4=$-0.8015\times10^{-4}$ A6=$0.6935\times10^{-6}$ A8=$-0.1183\times10^{-7}$ No.6 K=0.0 A4=$0.1089\times10^{-2}$ A6=$-0.2708\times10^{-4}$ A8=$0.4420\times10^{-6}$ Embodiment 3

Figure 5:
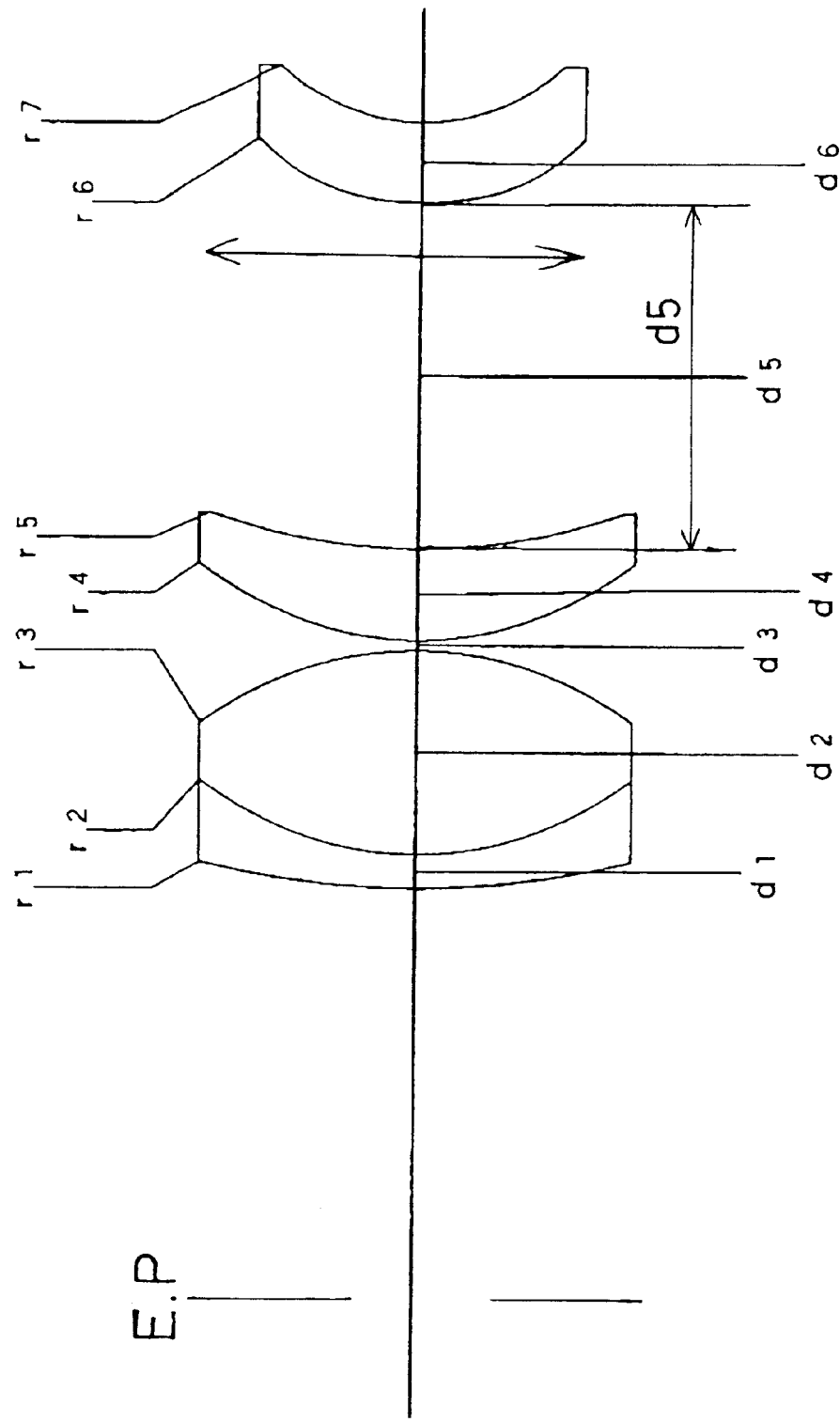
FIG. 5 is a lens arrangement of the third embodiment of an eyepiece optical system according to the present invention.
Figure 6:
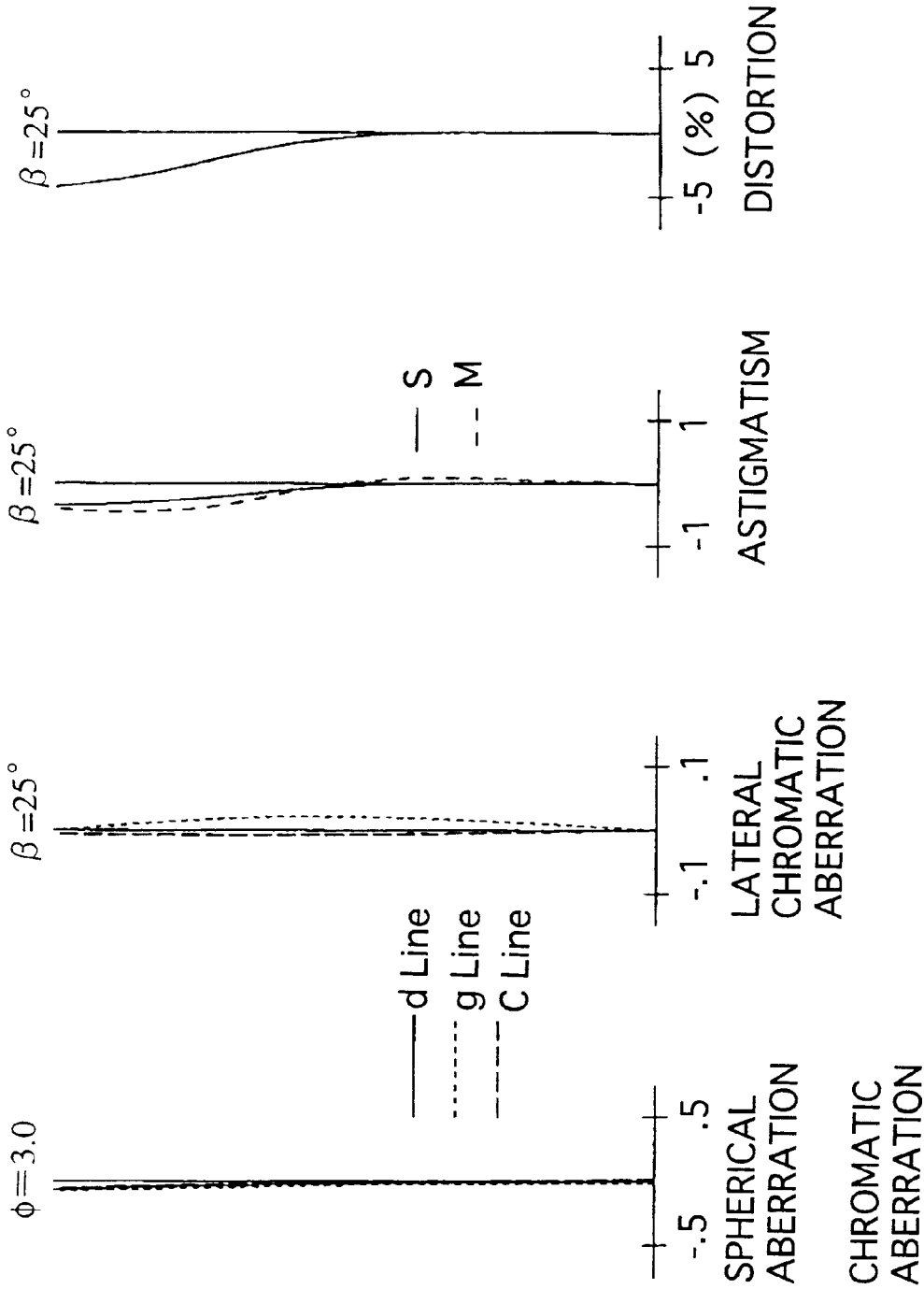
FIGS. 6A, 6B, 6C and 6D are aberration diagrams of the lens system of FIG. 5.

FIGS. 5 and 6A through 6D show the third embodiment of an eyepiece optical system according to the present invention. FIG. 5 is a lens arrangement of the eyepiece optical system, and Table 3 shows the lens data thereof. FIGS. 6A, 6B, 6C and 6D are aberration diagrams of the lens system of FIG. 5.

TABLE 3

$\phi = 3.0$
$f = 10.67$
m = 0.011
$\beta = 25°$
$f_b = -2.37$
ER = 12.0

| Surface No. | R | D | N | ν |
|---|---|---|---|---|
| 1 | 29.470 | 1.000 | 1.78472 | 25.7 |
| 2 | 11.471 | 6.000 | 1.58913 | 61.2 |
| 3 | -11.723 | 0.300 | — | — |
| 4* | 10.662 | 2.703 | 1.49176 | 57.4 |
| 5 | 20.000 | 10.214 | — | — |
| 6* | 11.603 | 2.352 | 1.49176 | 57.4 |
| 7 | 6.718 | — | — | — |

*designates the aspherical surface which is rotationally symmetrical with respect to the optical axis.

Aspherical surface data (the aspherical surface coefficients not indicated are zero (0.00)):

No.4 K=0.0 A4=$-0.9120\times10^{-4}$ A6=$0.5912\times10^{-6}$ A8=$-0.6375\times10^{-8}$ No.6 K=0.0 A4=$0.1942\times10^{-2}$ A6=$-0.5972\times10^{-4}$ A8=$0.9553\times10^{-6}$ The numerals for each condition for each embodiment are shown in Table 4.

TABLE 4

| | Embodiment 1 | Embodiment 2 | Embodiment 3 |
|---|---|---|---|
| Condition (1) | -9.25 | -6.35 | -3.62 |
| Condition (2) | -7.98 | -5.45 | -3.16 |
| Condition (3) | 2.17 | 2.18 | 2.12 |

As can be understood from Table 4, each embodiment satisfies conditions (1) through (3), and as shown in the aberration diagrams, aberrations are well corrected.

According to the present invention, a compact eyepiece optical system is provided in which aberrations are adequately corrected, while maintaining a sufficient length of the eye relief can be maintained.

What is claimed is:

1. An eyepiece optical system comprising a first lens group comprising a negative single meniscus lens element having a convex surface on the side of a user's eye, and a second lens group having positive power as a whole, in this order from an object;

wherein an intermediate image formed by an objective optical system is positioned between said first lens group and said second lens group;

wherein said second lens group comprises a positive single meniscus lens element having a convex surface on the side of a user's eye, and a cemented sub-lens group having positive power as a whole in this order from said object, and said cemented sub-lens group comprising a positive lens element and a negative lens element; and wherein the following conditions are satisfied:

$$-15 < f_1/f_e < -3.5$$

$$-10 < f_1/f_2 < -3.0$$

wherein
 $f_1$ designates the focal length of said first lens group;
 $f_2$ designates the focal length of said second lens group; and
 $f_e$ designates the focal length of the entire lens system.

2. The eyepiece optical system according to claim 1, wherein the following condition is satisfied:

$$1.5 < LD/f_e < 2.4$$

wherein
 LD designates the distance from the most object-side surface of said first lens group to the most user's eye-side surface of said second lens group.

3. The eyepiece optical system according to claim 1, wherein said negative meniscus single lens element comprises a plastic lens element, and wherein at least one surface thereof is an aspherical surface.

4. The eyepiece optical system according to claim 1, wherein said positive meniscus single lens element in said second lens group comprises a plastic lens element, and wherein at least one surface thereof is an aspherical surface.

* * * * *